No. 678,588. Patented July 16, 1901.
G. A. RYDER & A. PARKINSON.
COUPLING FOR DRAWING ROLLERS.
(Application filed Aug. 29, 1900.)
(No Model.)
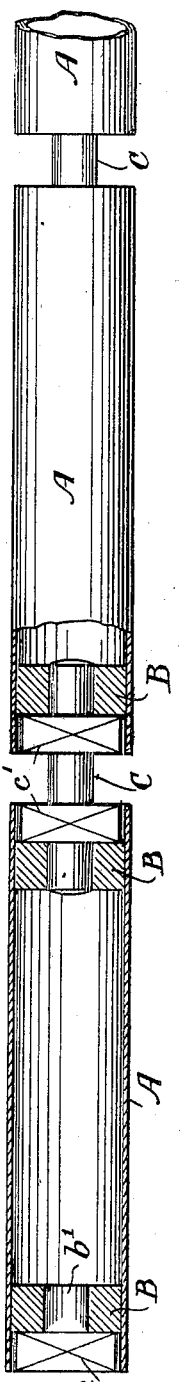
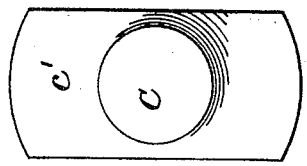
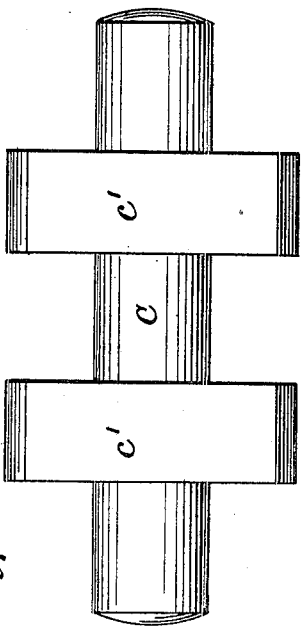
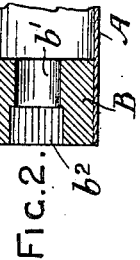
WITNESSES:
INVENTORS.
George Albert Ryder
Arthur Parkinson
BY
ATTORNEYS

United States Patent Office.

GEORGE ALBERT RYDER, OF BOLTON, ENGLAND, AND ARTHUR PARKINSON, OF PAISLEY, SCOTLAND.

COUPLING FOR DRAWING-ROLLERS.

SPECIFICATION forming part of Letters Patent No. 678,588, dated July 16, 1901.

Application filed August 29, 1900. Serial No. 28,462. (No model.)

*To all whom it may concern:*

Be it known that we, GEORGE ALBERT RYDER, of Turner Bridge Works, Bolton, in the county of Lancaster, England, and ARTHUR PARKINSON, of Mansion House road, Paisley, in the county of Renfrew, Scotland, have invented certain new and useful Improvements in Couplings for the Rollers Employed in Textile Machinery, of which the following is a specification.

Our invention relates to improvements in couplings for the rollers employed in textile machinery; and the object of our invention is to improve the method of coupling the rollers together and save the loss of time now caused when the rollers break at their couplings.

In the accompanying sheet of drawings, Figure 1 is an elevation, partly sectional, of a line of rollers coupled together according to our invention. Fig. 1ª is an end view of one of the rollers. Fig. 2 is a side sectional elevation of the end of one of the rollers shown in Fig. 1 after the roller has been turned a quarter of a revolution. Figs. 3 and 4 are detail views, on a larger scale, of one of the loose coupling-pieces.

In the case of heavy rollers—such as those illustrated and which are used, say, in thread-doubling machines—the rollers A are hollow, and we solder or otherwise secure a block B of metal in each end of each roller to be coupled. These blocks B are each previously prepared by boring therein a central hole $b'$ and then milling or otherwise cutting out a groove $b^2$ across the face of the block. The loose coupling-piece C is formed of a stud with ends of corresponding diameter to fit easily into the holes $b'$ in the blocks B and with two projections or driving-pieces $c'$ formed to fit into the grooves $b^2$ in the faces of the blocks. When inserted into the ends of two adjoining rollers A, as shown in Fig. 1, each piece C couples the adjacent ends, and the portion of the stud between the two driving projections $c'$ can be utilized as the journal or bearing for the rollers in the roller-stand.

This improved mode of coupling can be applied to all rollers used in preparing, spinning, and doubling machines, and as the coupling is a loose piece it can be made and kept in stock ready for use when required.

It will be obvious that the essential feature of the invention is the loose coupling-piece adapted to engage with a driving engagement the adjoining ends of two rollers and that the particular form of the coupling-piece may be varied or modified so long as this essential characteristic is retained.

What we claim as our invention, and desire to secure by Letters Patent of the United States, is—

The combination with hollow metal doubling-frame rollers, of a block fitted in the end of each thereof having a central cylindrical opening through the same and rectangular recesses therein and further combined with a coupling-piece comprising a cylindrical spindle, the end thereof being adapted to fit within the cylindrical opening in the blocks, and rectangular lugs spaced a distance apart on said spindle adapted to fit within the recesses in the blocks, the portion of the spindle between said lugs providing a journal.

In witness whereof we have hereunto set our hands in presence of two witnesses.

GEORGE ALBERT RYDER.
ARTHUR PARKINSON.

Witnesses:
  CARRIE JUDGE,
  CHARLES W. ALDOM, Jr.